(12) United States Patent
Tsengas

(10) Patent No.: US 7,938,085 B1
(45) Date of Patent: May 10, 2011

(54) PET ENCLOSURE

(75) Inventor: Steven Tsengas, Fairport Harbor, OH (US)

(73) Assignee: Ourpet's Co., Fairport Harbor, OH (US)

( * ) Notice: Subject to any disclaimer, the term of this patent is extended or adjusted under 35 U.S.C. 154(b) by 700 days.

(21) Appl. No.: 11/964,418

(22) Filed: Dec. 26, 2007

Related U.S. Application Data

(60) Provisional application No. 60/877,622, filed on Dec. 29, 2006.

(51) Int. Cl.
*A01L 1/03* (2006.01)

(52) U.S. Cl. .......................... 119/498; 119/474

(58) Field of Classification Search .................. 119/498, 119/474, 491, 492, 499
See application file for complete search history.

(56) References Cited

U.S. PATENT DOCUMENTS

| | | | |
|---|---|---|---|
| 4,807,808 A * | 2/1989 | Reed | 229/103 |
| 6,092,488 A * | 7/2000 | Allawas | 119/497 |
| 6,460,486 B1 * | 10/2002 | Powers et al. | 119/452 |
| D483,156 S | 12/2003 | Simpson | |
| 6,997,138 B1 | 2/2006 | Simpson | |
| 7,228,820 B1 * | 6/2007 | Kellogg et al. | 119/498 |
| 7,481,182 B2 * | 1/2009 | Simpson et al. | 119/168 |
| 2002/0100431 A1 * | 8/2002 | Sherman et al. | 119/499 |
| 2005/0005871 A2 * | 1/2005 | Farmer et al. | 119/474 |
| 2005/0076854 A1 * | 4/2005 | Passno et al. | 119/500 |
| 2005/0103279 A1 * | 5/2005 | Brewer et al. | 119/498 |
| 2006/0005781 A1 * | 1/2006 | Marchioro | 119/474 |
| 2006/0107903 A1 * | 5/2006 | Jin | 119/499 |
| 2008/0196673 A1 * | 8/2008 | Cudia et al. | 119/473 |
| 2008/0245313 A1 * | 10/2008 | Jakubowski et al. | 119/497 |

* cited by examiner

*Primary Examiner* — Yvonne R. Abbott
(74) *Attorney, Agent, or Firm* — John D. Gugliotta, P.E., Esq.

(57) ABSTRACT

A pet enclosure comprising a floor panel, vertical sidewalls and a top panel connected by means of extruded corner members to form a rectangular box-like structure having two openings at opposite ends. A front and a rear door panel is removably mounted to and secured to the enclosure at the openings by means of pins that are connected to a spring latch; they engage latch holes on the corner members.

13 Claims, 5 Drawing Sheets

PET ENCLOSURE

RELATED APPLICATIONS

The present applications is a Continuation of U.S. Ser. No. 60/877,622 and it claims a benefit to ('622)'s Dec. 29, 2006 filing date. The present application further incorporates all of the subject matter of ('622) as if it fully rewritten herein.

BACKGROUND OF THE INVENTION

1. Field of the Invention

The present invention relates generally to a field of pet enclosures and, more particularly, to a pet enclosure having six panels that easily and speedily assemble and disassemble by means of four corner members.

2. Description of the Related Art

There are many advantages to pet enclosures used to contain domestic animals in the home. One advantage includes an enclosing of rowdy or teething pets when owners are not present to supervise them. A disadvantage to these enclosures is that their unaesthetic appearance causes them to be placed in areas hidden from the family. Pets are discouraged from treating these enclosures as a desired safe place; their interaction with family is limited if they treat the enclosure as a safe place. Pet enclosures varying is size, material, shape and design are marketed to overcome these non-aesthetic designs, wherein they are desired to be more complimentary to standard home decors. The designs have expanded to include may advantage functions, such as a convenient assembly and disassembly for all of cleaning, storage and transport purposes.

A search of the prior art reveals no patents that read directly on the claims of the instant invention; however, the following reference is considered related: the collapsible pet enclosure of U.S. Pat. No. 6,997,138, to Simpson, which discloses a pet enclosure comprising a variety of panels having a stranded material woven onto a substantially rigid frame. The panels hingedly connect to one another to form an opening in which a door is pivotally mounted to either swing inwardly and outwardly or to close by means of a latch. The enclosure further comprises both a floor panel having a plurality of legs to support the floor from a distance above the underlying surface and a channel for receiving a cooperating base portion. The enclosure can be easily set up and folded for use or it can be unfolded to a flat position for storage and transport.

There are several disadvantages to the pet enclosure disclosed in Simpson: (1) the enclosure can be unfolded to a flat position for cleaning purposes, but the unfolded position is too space consuming for convenient storage; (2) the enclosure requires tools for assembly and disassembly; and, (3) the doorway swings outwards by means of a hinge that precludes the enclosure's placement along walls adjacent to the hinge.

Thus, a need is long felt for an improved pet enclosure that easily, speedily and repeatedly assembles and disassembles into a compact state for cleaning, transport and storage purposes and, more specifically, to a pet enclosure that provides for door panels to be removably mounted to and secured to the openings formed along the widths of panels.

SUMMARY OF THE INVENTION

It is an object of the present invention to provide an easy and a speedy way to both assemble and to disassemble the six panels of an improved pet enclosure having an aesthetic design.

It is a feature of the present invention to comprise four extruded corner members, each member having two channels along its lengths on adjacent sides and receiving slots at the channels' ends.

It is a further feature of the present invention to comprise a rectangular floor panel, two rectangular vertical sidewalls and a rectangular top panel having engaging rails along their lengths which travel along the channels and connect to the panels.

Briefly described according to one embodiment of the present invention, the floor panel, vertical sidewalls and the top panel are connected by means of extruded corner members to form a rectangular box-like structure having two openings at opposite ends. A front and a rear door panel is removably mounted to and secured to the enclosure at the openings by means of pins that are connected to a spring latch and they engage latch holes on the corner members.

It is an advantage to the present invention to comprise a floor panel that can be easily removed for cleaning as opposed to one comprising a channel to house a removable base portion.

It is another advantage of the present invention to provide for a six step assembly that requires no tools and no heavy labor.

It is another feature of the present invention to provide easy disassembly for cleaning and compact storage.

It is another feature of the present invention to provide for an improved pet enclosure comprising components that are inexpensive to manufacture.

It is another feature of the present invention to manufacture the components from non-porous materials that don't absorb malicious pet odors.

It is another feature of the present invention to provide ventilation designs on the panels to provide to the pet light and fresh air.

It is a final feature of the present invention to provide for an improved pet enclosure that is aesthetically appealing and compliments any home decor.

BRIEF DESCRIPTION OF THE DRAWINGS

The advantages and the features of the present invention are better understood with reference to the following and the more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
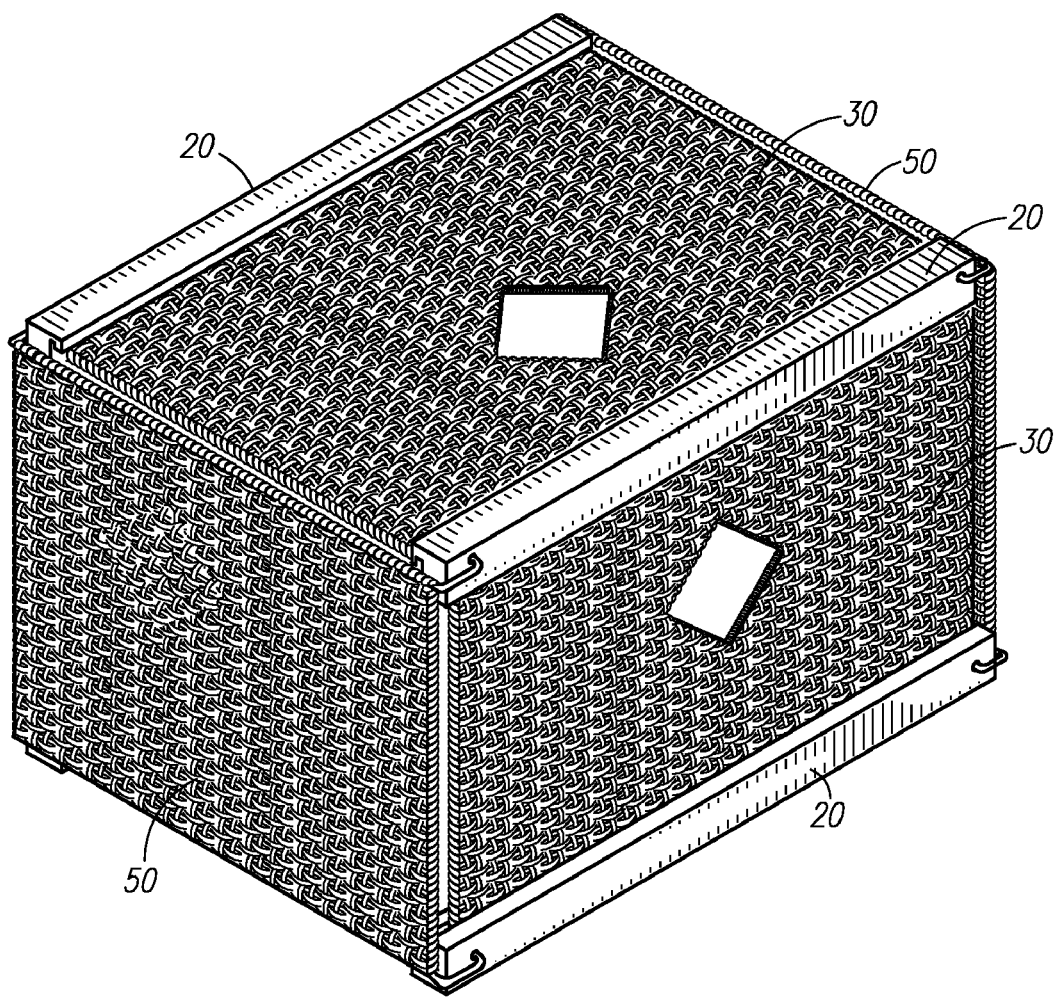
FIG. 1 is an elevational view of a fully assembled pet enclosure according to a preferred embodiment of the present invention.

An improved pet enclosure 10 is shown in FIG. 1 according to a preferred embodiment of the present invention. To achieve the objectives of the present invention, FIGS. 2-5 show a plurality of elements that assemble together to comprise the improved pet enclosure 10. According to the preferred embodiment, a fully assembled pet enclosure 10 comprises four corner members 20, three rectangular sidewalls 30, a floor panel 40, and a front 50a and a rear 50b door panel. In the assembled position, two sidewalls 30 stand vertically and parallel to one another. The lengths of a third sidewall 30 (top panel) and a floor panel 40 lay in between and perpendicular to the lengths of the vertical sidewalls 30. The door panels 50a, 50b stand upright and are perpendicular to the side panels 30 and the floor panel 40. A generally rectangular box is thereby formed.

FIGS. 2a-2d show alternative views of the four extruded corner members 20 that are positioned horizontally when the improved pet enclosure is fully assembled. The four corner members 20 are provided to fasten the three sidewalls 30 and the floor panel 40 shown in FIG. 1 together. This is accomplished by means of two receiving channels 22 that run an entire length of the corner members 20. The two receiving channels 22 are positioned on adjacent sides. Both ends of each member comprise receiving slots 24 that receive engaging rails positioned on the sidewalls. The four members 20 shown in FIGS. 2a-2d are identical for purposes of this disclosure, except that they comprise latch holes 26 positioned in different locations to receive latches on either the front 50a or the rear 50b panel. The latch holes 26 are positioned on both ends of one of the two exterior sides 20a, 20b of the extruded corner member opposing the interior sides having channels 22. When the improved pet enclosure is fully assembled, the latch holes 22 face outwards from the exterior of the vertical sides 20a, 20b of the corner members 20 so that the front and the rear door panels can be easily secured and removed.

Figures 2A, 2B:
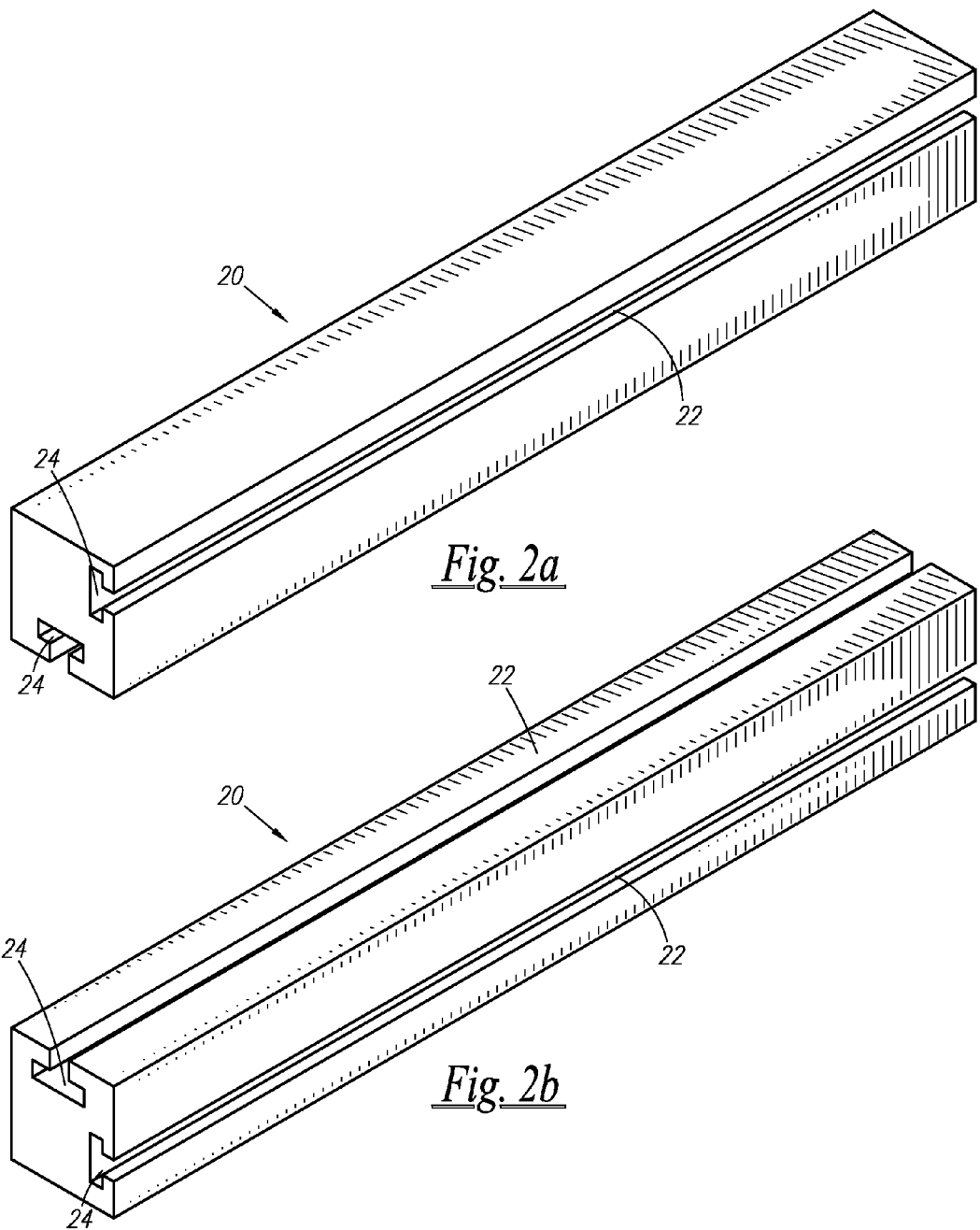
FIG. 2a is an elevational view of an extruded corner member according to the invention shown in FIG. 1.
FIG. 2b is an alternate elevational view of the interior sides of the extruded corner member.
Figures 2C, 2D:
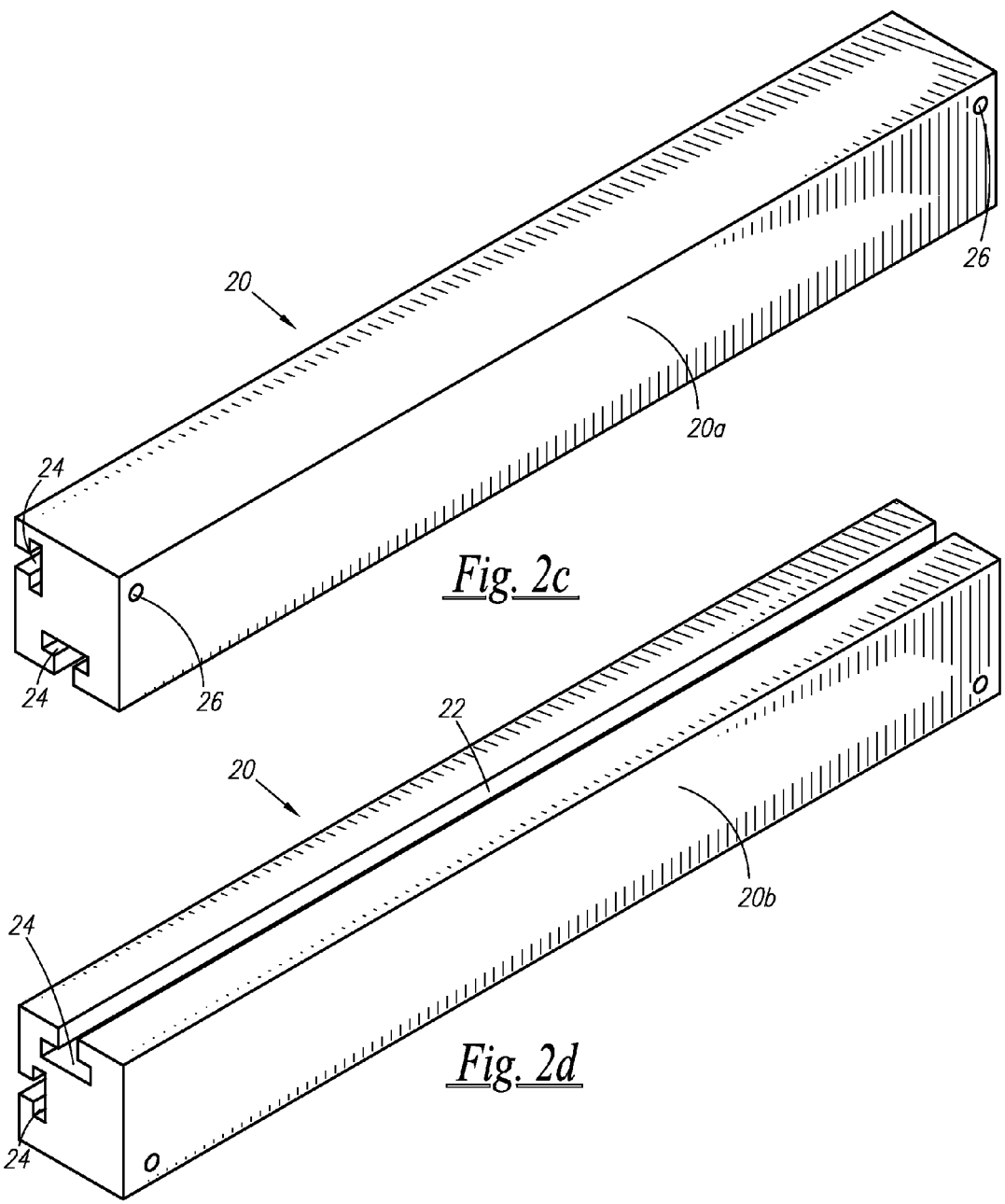
FIG. 2c is an alternate elevational view of the exterior sides of the extruded corner member, wherein latch holes are positioned on a first of the two exterior sides.
FIG. 2d is an alternate elevational view of the extruded corner member, wherein latch holes are positioned on a second of the two exterior sides.

FIG. 2a shows an interior of an extruded corner member 20, wherein the member secures the top and the right panels. FIG. 2b shows an alternate embodiment of an extruded corner member 20, wherein the member secures the right panel to the floor panel. FIG. 2c shows the first of two exterior sides 20a of an extruded corner member 20 comprising latch holes 22, wherein the member secures the top panel to the left panel. FIG. 2d shows an alternate of an extruded corner member 20, wherein the second exterior side 20b comprises the latch holes 22 and the corner member 20 secures the left panel to the floor panel.

Figure 3:
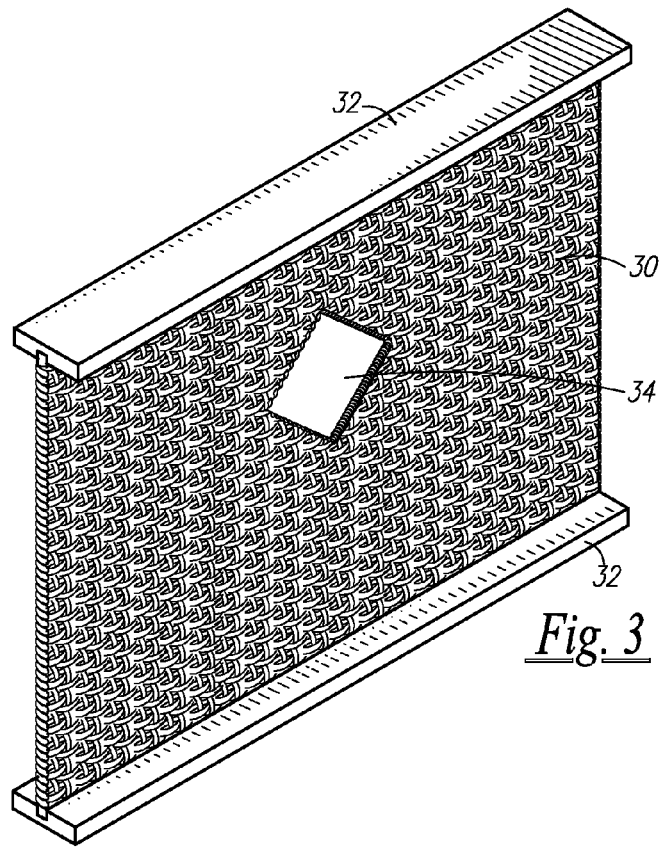
FIG. 3 is an elevational view of a sidewall, wherein the sidewall functions as a top panel or one of two vertical sidewalls.

FIG. 3 shows a wicker sidewall 30 according to the preferred embodiment of the present invention, wherein a fully assembled pet enclosure comprises three identical rectangular sidewalls 30: one provided to function as a top panel and two provided to function as vertical panels. A ventilation opening 34 is defined on each sidewall to provide fresh air to the pet housed in the enclosure and to provide light to the pet. The wicker sidewall comprises two opposing engaging rails 32 along its length. The engaging rails 32 enter the receiving slot 24 and travel the channels 22 positioned on the corner members 20 shown in FIGS. 2A-2D.

Figure 4:
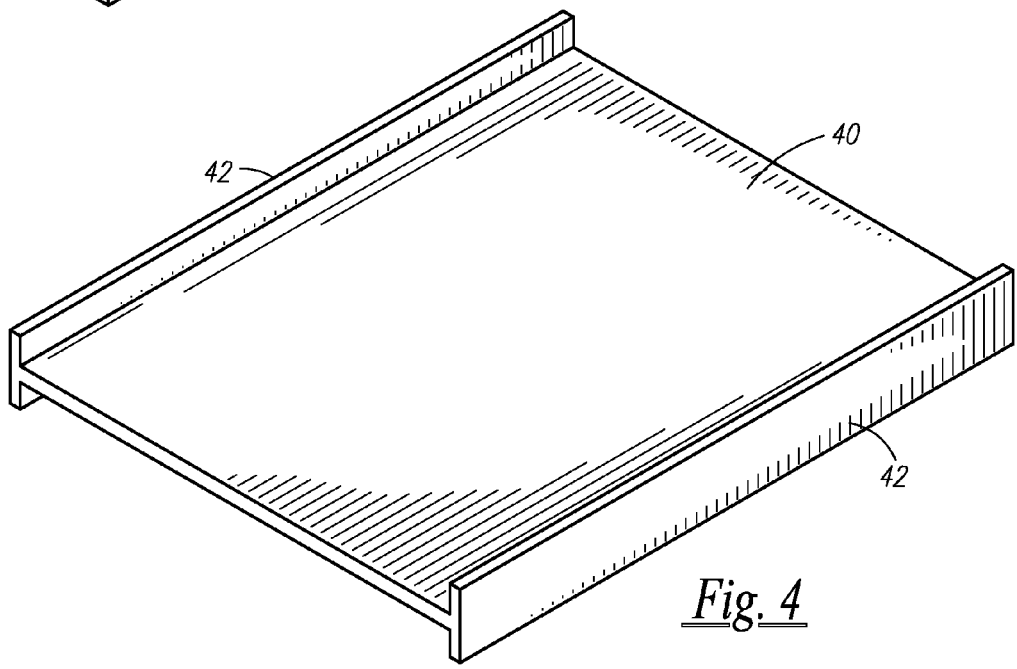
FIG. 4 is an elevational view of the top of the floor panel.

FIG. 4 shows a view of the inside of the rectangular floor panel 40 according to the preferred embodiment, wherein the floor panel 40 similarly comprises two opposing engaging rails 42 along its length.

Figure 5:
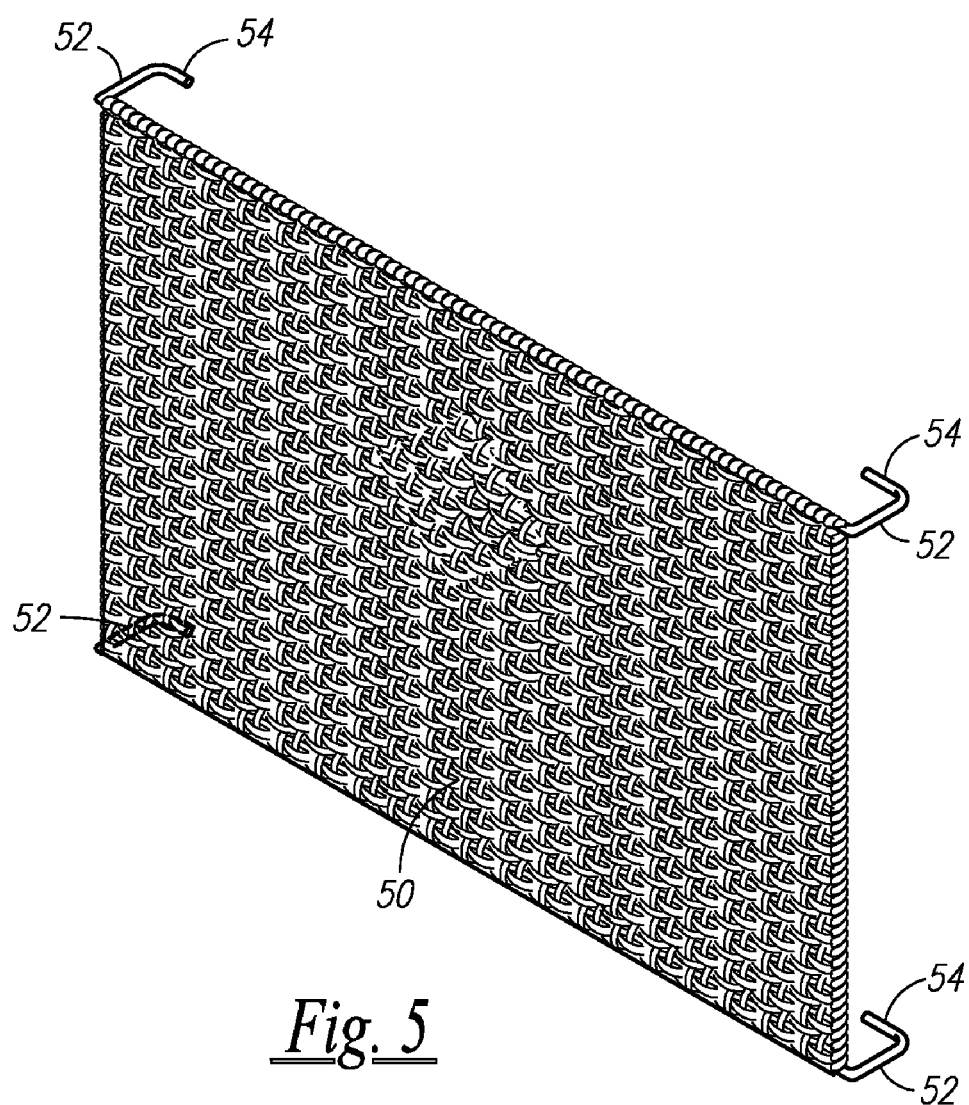
FIG. 5 is an elevational view of a door panel, wherein door panels are placed on the front and the rear of the pet enclosure.

FIG. 5 shows an exterior of one of the two wicker door panels 50, square in shape. Both door panels 50a, 50b are fastened to the front and to the rear of the fully assembled pet enclosure 10 (shown in FIG. 1). The door panels comprise four spring return latches 52 that extend inwards from the four corners. The latches 52 comprise pins 54 that engage the latch holes 26 positioned on the corner members 20a, 20b (shown in FIGS. 2c-2d. The latches 52 are provided to fasten the door members 50 to the sidewalls. The door panels 50a, 50b are removably secured to the enclosure 10 so that pets can crawl in and out of the internal space formed by the panels.

2. Operation of the Preferred Embodiment

The improved pet enclosure is easily and speedily assembled and disassembled for convenient transport and storage. No tools are required for assembly. When assembled, the floor panel forms the base portion of the enclosure and it is preferably formed of or coated with a rubber, plastic or other soft material to prevent marring of the floor or the other underlying support surface. The two vertical sidewalls are secured to the floor panel by means of corner members. The top panel is also secured to the two sidewalls by means of corner members. As assembled thus far, two openings are formed along the widths of the four panels at opposing ends of the enclosure. The door panels are mounted to and secured to the enclosure at these openings by means of a latch that engages latch holes positioned on the corner members.

Each panel preferably comprises strands or sheets of flexible, non-porous material, such as thermoplastic extruded resin, having the appearance of natural rattan or wicker and, more specifically, extrusion strands of high-density polyethylene having both a yellow, a tan or a brown color and one or more lines or patterns. It is preferable that the extrusion strands have a visibly darker or a lighter shade of yellow, tan or brown color coextruded therewith, or otherwise applied thereon, along the axis of the strand. A diameter or a width of the strands is 3/32" and it optionally comprises one or more serrations or surface irregularities extruded along the axis thereof. It is anticipated that these serrations both reduce glare and provide a more natural appearance. The panels may be woven with either a decorative pattern or a decorative design to further improve the aesthetics of the enclosure. The improved enclosures can vary in size to accommodate the size of the pet.

The foregoing descriptions of specific embodiments of the present invention are presented for purposes of illustration and description. They are not intended to be exhaustive nor to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and to their equivalents. Therefore, the scope of the invention is to be limited only by the following claims.

Having thus described the invention what is claimed as new and desired to be secured by Letters Patent is as follows:

1. An improved pet enclosure comprising four extruded corner members, wherein each of said corner members comprise:
   receiving channels that extend along the lengths of two adjacent sides of said member;
   receiving slots positioned on both ends of said receiving channels; and
   two latch holes opposing said channels on the ends of one of the two adjacent sides not comprising said channels; and
   three side panels formed of a woven, flexible, non-porous material;
   a floor panel; and
   a front and a rear door panel formed of a woven, flexible, non-porous material,
   wherein said three side panels and said floor panel combine to define two openings in which said door panels are removably secured.

2. The improved pet enclosure of claim 1, wherein engaging rails extend along lengths of said side panels and said floor panel.

3. The improved pet enclosure of claim 2, wherein two of said side panels are perpendicularly connected along their lengths to one another by means of said engaging rail engaging said receiving slot and traveling along said adjacent channel on said corner member.

4. The improved pet enclosure of claim 3, wherein the plurality of said side panels connect to define two openings formed along the widths of said panels at opposing ends of said enclosure.

5. The improved pet enclosure of claim 4, wherein said front and said rear door panels are mounted to and removably secured to said enclosure at said openings by means of pins positioned on four spring latches that engage said latch holes on said corner members.

6. The improved pet enclosure of claim 1, wherein two of said side panels are perpendicularly connected along their lengths to one another by means of said engaging rail engaging said receiving slot and traveling along said adjacent channel on said corner member.

7. The improved pet enclosure of claim 6, wherein the plurality of said side panels connect to define two openings formed along the widths of said panels at opposing ends of said enclosure.

8. The improved pet enclosure of claim 7, wherein said front and said rear door panels are mounted to and removably secured to said enclosure at said openings by means of pins positioned on four spring latches that engage said latch holes on said corner members.

9. The improved pet enclosure of claim 1, wherein said woven, flexible, non-porous is a plastic having the appearance of natural rattan or wicker.

10. The improved pet enclosure of claim 1, wherein said side panels comprise a ventilation opening to provide fresh air to the pet housed in said enclosure.

11. The improved pet enclosure of claim 1, wherein said front and said rear door panel comprise a ventilation opening to provide fresh air to the pet housed in said enclosure.

12. The improved pet enclosure of claim 1, wherein said three side panels and said floor panel are generally flat and rectangular.

13. The improved pet enclosure of claim 1, wherein said corner members are provided both for said side panels and said floor panel to be removably connected to one another in an assembled configuration and for the parts of said enclosure to be disassembled for compact storage.

* * * * *